United States Patent Office 2,984,663
Patented May 16, 1961

2,984,663

METHIN DYES CONTAINING HYDROXY-PYRROLINE NUCLEI

Douglas James Fry, Bernard Alan Lea, and John David Kendall, all of Ilford, England, assignors to Ilford Limited, Ilford, England, a British company No Drawing. Filed May 18, 1959, Ser. No. 813,655

Claims priority, application Great Britain June 4, 1958

6 Claims. (Cl. 260—240.4)

This invention relates to new pyrroline dyes, to their manufacture and to photographic silver halide emulsions containing said dyes.

Hydroxy pyrroline bases of the general Formula I:

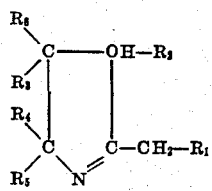

wherein $R_1$, $R_2$, $R_3$ and $R_6$ are each a hydrogen atom or an alkyl group, and $R_4$ and $R_5$ are separate alkyl groups, may be made by treating a pyrroline N-oxide of general Formula II:

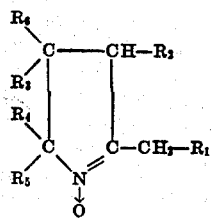

where the groups $R_1$, $R_2$, $R_3$, $R_4$, $R_5$ and $R_6$ have the meanings assigned to them above, with acetic anhydride, distilling off the excess acetic anhydride and boiling the residue with an aqueous non-oxidising mineral acid such as hydrochloric acid or sulphuric acid. In this context so-called "concentrated" sulphuric acid, which includes only a very small percentage of water, is not included since this reagent converts the compound directly to a pyrrolenine compound.

Typical compounds of the series are:

3-hydroxy-2:3:5:5-tetramethyl pyrroline, B. Pt. 110° C./2 mm. Hg, M. Pt. 62° C.
3-hydroxy-2:5:5-trimethyl-Δ'-pyrroline, B. Pt. 90° C./2 mm. Hg.
3-hydroxy-2:4:4:5:5-pentamethyl-pyrroline, B. Pt. 100° C./0.1 mm. Hg.

According to the present invention there is provided a new series of methin dyes which contain a hydroxy pyrroline nucleus of Formula I connected to the remainder of the dye molecule at the methylene group indicated in said formula in the 2-position.

Typical dyes thus provided conform to the following general formulae:

FORMULA III

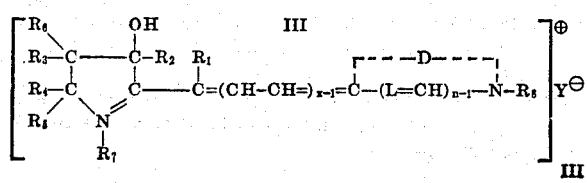

where $R_1$, $R_2$, $R_3$, $R_4$, $R_5$ and $R_6$ have the meanings given above, $R_7$ is an alkyl or aralkyl group, $R_8$ is an alkyl, aralkyl or aryl group, $x$ is 1, 2, 3 or 4, L is a nitrogen atom or a methin group, and $n$ is 1 or 2, D is the residue of a 5- or 6-membered heterocyclic ring, and Y is an anion.

FORMULA IV

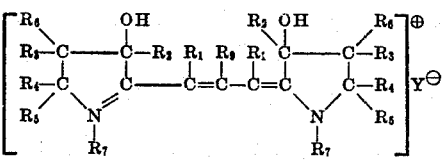

where $R_1$, $R_2$, $R_3$, $R_4$, $R_5$, $R_6$, $R_7$ and Y have the meanings given above and $R_9$ is an alkyl group.

FORMULA V

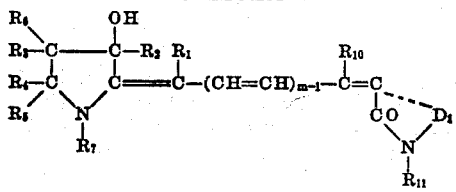

where $R_1$, $R_2$, $R_3$, $R_4$, $R_5$, $R_6$ and $R_7$ have the meanings given above, $R_{10}$ is a hydrogen atom or an alkyl group, $R_{11}$ is an alkyl, aryl or aralkyl group, a hydroxy carbonyl alkyl group or an alkoxy carbonyl alkyl group, $D_1$ is the residue of a 5- or 6-membered heterocyclic ring, and $m$ is 1, 2 or 3.

FORMULA VI

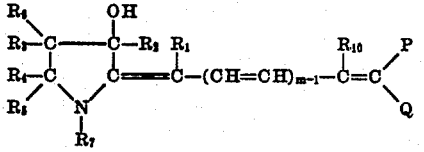

where $R_1$, $R_2$, $R_3$, $R_4$, $R_5$, $R_6$, $R_7$, $R_{10}$ and $m$ have the meanings given above, P and Q are each either an acyl, alkoxycarbonyl or cyano group.

According to a further feature of the present invention, the aforesaid methine dyes are prepared from intermediates of general Formula I by methods known per se (as being in use or as described in the literature) for the conversion of a heterocyclic base containing an extra nuclear reactive methylene group to a methin dye.

More particularly the foregoing and other dyes according to this invention may be produced by condensing an alkyl or aralkyl quaternary salt of a compound of general Formula I with any of the following:

(a) A compound of general Formula VII:

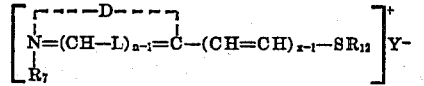

where $n$, $x$, $R_7$, Y, L and D have the meanings assigned to them above, and $R_{12}$ is an alkyl, aryl or aralkyl group.

(b) A compound of general Formula VIII:

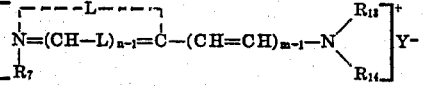

where $R_7$, D, L, $n$ and Y have the meanings assigned to them above, $R_{13}$ is a hydrogen atom or an acyl group, $R_{14}$ is a substituted or unsubstituted phenyl group, and $m$ is 2, 3 or 4.

(c) An ester of an ortho acid or trithio ortho acid such as ethyl orthoformate or ethyl trithio orthoformate.

(d) β-Anilino acrolein anil or glutaconic aldehyde dianil.

(e) A compound of the general Formula IX:

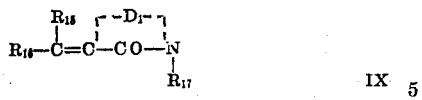

where $R_{15}$ is a hydrogen or an alkyl group, $R_{16}$ is an alkoxy, alkylthio, anilino or acetanilido group, $R_{17}$ is an alkyl, aryl or aralkyl group, a hydroxy carbonyl alkyl group, or an alkoxy carbonyl alkyl group, and $D_1$ is the residue of a five-membered or six-membered heterocyclic nucleus.

(f) A compound of the general Formula X:

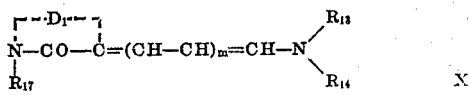

where $R_{13}$, $R_{14}$, $R_{17}$ and $D_1$ have the meanings assigned to them above, and m is 1 or 2.

(g) A compound of the general Formula XI:

where $R_{10}$ has the meaning assigned to it above, $R_{18}$ is an alkoxy, alkylthio, anilino or acetanilido group, and P and Q each represent either an acyl, alkoxyl carbonyl or cyano group.

(h) A compound of the general Formula XII:

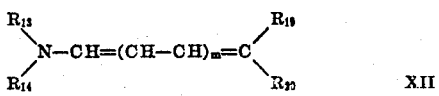

where $R_{13}$, $R_{14}$ have the meanings assigned to them above, $R_{19}$ and $R_{20}$ are each an acyl, alkoxy carbonyl or cyano group, and m is 1 or 2.

The dyes obtained by using intermediates (a) and (b) are unsymmetrical mono- or polymethincyanine dyes, using intermediates (c) are symmetrical trimethin cyanine dyes, using intermediates (d) are symmetrical penta- or heptamethincyanine dyes, and using intermediates (e), (f), (g) and (h) are merocyanine dyes.

In preparing the dyes the reactions are preferably effected in a solvent medium and in the presence of a basic condensing agent, e.g. triethylamine.

In a modification of the invention the quaternary salts of the hydroxypyrrolines of general Formula I may be reacted in acetic anhydride with an alkyl ester of trithioformic acid or with diphenylformamidine, β-anilinoacrolein anil or with glutaconic aldehyde dianil to give intermediates of Formula XIII:

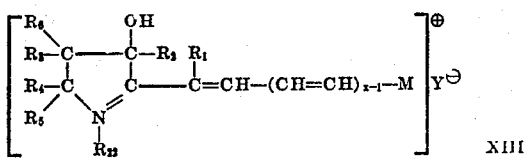

where $R_1$, $R_2$, $R_3$, $R_4$, $R_5$ and $R_6$ have the meanings given in Formula I, Y is an acid radical, M is an alkylthio or acetanilido group, x is 1, 2 or 3 (except that when M is an alkylthio group x is 1), and $R_{22}$ is an alkyl or aralkyl group.

These intermediates may be reacted with the quaternary salts of heterocyclic compounds having an active methyl or methylene group to form cyanine dyes or with a compound having an open-chain or cyclic reactive methylene group to form merocyanine dyes.

The hydroxy group present in the dyes may be acylated by heating with an excess of an aliphatic acid anhydride in pyridine solution.

The dyes are valuable sensitisers for photographic silver halide emulsions, particularly gelatino silver chlorobromide emulsions, and may be used in the manner known per se for methin dyes used as optical sensitisers for photographic emulsions. This invention includes photographic silver halide emulsions containing the said dyes in sensitizing amount.

The following examples will serve to illustrate the invention:

*Example 1*

3-ETHYL-2-THIO-5[(3-HYDROXY-1:3:5:5-TETRAMETHYL-2-PYRROLIDINYLIDENE) ETHYLIDENE]-THIAZOLID-4-ONE 3-hydroxy-2:3:5:5-tetramethyl-Δ'-pyrroline (1.4 g.) and methyl iodide (1.4 ml.) were mixed, warmed for 10–15 minutes and excess methyl iodide then evaporated off under reduced pressure. To the solid quaternary salt were added 5-ethoxymethylene-3-ethyl-2-thio-thiazolid-4-one (2.1 g.), ethanol (20 ml.) and triethylamine (1.4 ml.), the whole then being heated under reflux for 10 minutes, followed by cooling in ice. The product crystallized when water (40 ml. approx.) was added and after filtration and washing with a small amount of ethanol, 2.3 g. of dye with M.Pt. 191–204° C. was obtained. After two crystallisations from ethanol (25 ml. per gm.) the dye formed orange rods (1.25 g.) with M.Pt. 214–216° C.

When incorporated in a silver chlorobromide emulsion the sensitivity was extended to 5750 A. with a maximum at 5250 A.

*Example 2*

1:3-DIMETHYL-5[(3-HYDROXY-1:3:5:5-TETRAMETHYL-2-PYRROLIDINYLIDENE) ETHYLIDENE]-2-THIO-HYDANTOIN 3-hydroxy-2:3:5:5-tetramethyl-Δ'-pyrroline (1.4 g.) and methyl iodide (1.4 ml.) were mixed, warmed for 10–15 minutes and then the excess methyl iodide evaporated off under reduced pressure. Diphenyl formamidine (2.0 g.) and acetic anhydride (10 ml.) were then added and the whole heated under reflux for 15 minutes, cooled in ice and poured into dry ether (200 ml.). The precipitated gum was stirred twice with fresh portions of ether (25 ml.) and then dissolved in ethanol (10 ml.). To this solution was added 1:3-dimethyl-2-thiohydantoin (1.05 g.) and triethylamine (1.4 ml.) After heating under reflux for 8 minutes the solution was cooled and diluted with water (approx. 40 ml.). The somewhat sticky crystals formed were filtered off and washed with ether to give a detached solid (1.0 M. Pt. 193–196° C.). After crystallisation from ethanol (22 ml.), the product was obtained as short microscopic prisms (0.47 g.) with M. Pt. 217–219° C. not raised by further crystallisation.

When incorporated in a silver chlorobromide emulsion the sensitivity was extended to 5450 A. with a maximum at 4950 A.

*Example 3*

3-ETHYL-2-THIO [(3 - HYDROXY - 1:4:4:5:5 - PENTAMETHYL - 2 - PYRROLIDINYLIDENE) ETHYLIDENE]-THIAZOLID-4-ONE

From 3-hydroxy-2:4:4:5:5 - pentamethyl-Δ'-pyrroline (1.5 g.), using the method of Example 1, the dye was obtained as orange plates (0.11 g.) with M. Pt. 202–204° C. after crystallisation from ethanol followed by recrystallisation from a mixture of equal volumes of benzene and cyclohexane.

*Example 4*

3-ETHYL-2-THIO-[(3-HYDROXY-1:5:5-TRIMETHYL-2-PYRROLIDINYLIDENE) ETHYLIDENE]-THIAZOLID-4-ONE

From 3-hydroxy-2:5:5-trimethyl-Δ'-pyrroline (1.25 g.), using the method of Example 1, the dye was obtained as minute purple cubes (0.12 g.) with M. Pt. 208–210° C. after two crystallisations from benzene.

When incorporated in a silver chlorobromide emulsion the sensitivity was extended to 5650 A. with a maximum at 5250 A.

Example 5

3-ETHYL-2-THIO-[(3-ACETOXY-1:3:5:5 - TETRAMETHYL-2-PYRROLIDINYLIDENE) ETHYLIDENE]-THIAZOLID-4-ONE

3 - ethyl - 2 - thio - [(3 - hydroxy - 1:3:5:5 - tetramethyl-2-pyrrolidinylidene) ethylidene] - thiazolid-4-one (0.82 g.) was added to a mixture of pyridine (17.6 ml.) and acetic anhydride (2.4 ml.). The resulting solution was heated on a steam bath for 2 hours, cooled, poured on to crushed ice and then left to stand until the ice had melted. Filtration gave 0.7 g. of crude product with M. Pt. 155–160° C. Crystallisation from a mixture of equal volumes of benzene and cyclohexane gave 0.54 g., M. Pt. 158–160° C., while a further crystallisation from ethanol (25 ml.) gave small orange rods (0.27 g.) with M. Pt. 162–164° C.

When incorporated in a silver chlorobromide emulsion the sensitivity was extended to 5700 A. with a maximum at 5300 A.

Example 6

2(3-METHYL BENZTHIAZOLE 1-2(1:3:5:5-TETRAMETHYL-3-HYDROXY PYRROLINE) MONOMETHINCYANINE IODIDE 3-hydroxy-2:3:5:5-tetramethyl-Δ'-pyrroline (1.4 g.) and methyl iodide (1.4 ml.) were mixed, warmed for 10–15 minutes and then excess methyl iodide evaporated off under reduced pressure. 2-methylthiobenzthiazole metho-toluene-p-sulphonate (3.7 g.) and ethanol (10 ml.) were then added, the mixture warmed, triethylamine (1.4 ml.) added and the whole heated under reflux for 5 minutes. The cooled solution was then poured into dry ether (100 mls.) to precipitate an oil which then crystallised. The crude product was filtered off, washed with ether and then methanol to leave 2.8 g. of material which was crystallised from ethanol (100 mls.) to give microscopic plates (0.95 g.) with M. Pt. 231–232° C.

Example 7

1-METHYL-3-PHENYL-5[(3-HYDROXY-1:3:5:5 - TETRAMETHYL - 2 - PYRROLIDINYLIDENE ETHYLIDENE]-2-THIOHYDANTOIN 3-hydroxy-2:3:5:5-tetramethyl-Δ'-pyrroline (1.4 g.) and methyl iodide (1.4 ml.) were mixed, warmed under reflux for 10–15 minutes and then the excess methyl iodide evaporated off under reduced pressure. Diphenyl formamidine (2.0 g.) and acetic anhydride (10 ml.) were then added and the whole heated under reflux for 15 minutes, cooled in ice and poured into dry ether. The precipitated gum was twice stirred with fresh portions of ether (25 ml.) and then dissolved in ethanol (10 ml.). To this solution was added 1-methyl-3-phenyl-2-thiohydantoin (1.5 g.) and triethylamine (1.4 ml.). After heating under reflux for 10 minutes the solution was cooled and diluted with water (100 ml.) to precipitate an oil which crystallised when stirred with a small volume of methanol. After filtering off, the crude product (0.98 g. M. Pt. 185–188° C.) was recrystallised from a mixture of benzene and cyclohexane to give the dye (0.4 g.) with M. Pt. 211–214° C.

When incorporated in a silver chlorobromide emulsion the sensitivity was extended to 5450 A. with a maximum at 5000 A.

Example 8

2(1-ETHYL-3-HYDROXY-3:5:5-TRIMETHYL-Δ' - PYRROLINE) - 2(1 - ETHYLQUINOLINE) MONOMETHINCYANINE PERCHLORATE 3-hydroxy-2:3:5:5-tetramethyl-Δ'-pyrroline (1.1 g.) and ethyl iodide (1.1 ml.) were mixed, heated under reflux for 10–15 minutes and then excess methyl iodide evaporated off under reduced pressure. To this was added the quaternary salt (formed by 3 hours' fusion at 130° C.) from 2-ethylthio-quinoline (1.9 g.) and ethyl toluene-p-sulphonate (2.2 g.), followed by ethanol (10 ml.) and triethylamine (1.4 ml.). After heating under reflux for 15 minutes the reaction mixture was cooled and diluted with a strong aqueous solution of sodium perchlorate to precipitate an oil which slowly crystallised when stirred with acetone. The solid was filtered off and recrystallised from a mixture of ethanol (2.5 ml.) and ethyl acetate (2.5 ml.) to give the product (0.1 g.) with M. Pt. 172° C.

Example 9

1:3-DIETHYL-5[(3-HYDROXY-1:3:5:5-TETRAMETHYL-2-PYRROLIDINYLIDENE) ETHYLIDENE]-2-THIO-BARBITURIC ACID 3-hydroxy-2:3:5:5-tetramethyl-Δ'-pyrroline (1.4 g.) and methyl iodide (1.4 ml.) were mixed, warmed under reflux for 10–15 minutes and then the excess methyl iodide evaporated off under reduced pressure. Diphenyl formamidine (2.0 g.) and acetic anhydride (10 ml.) were then added and the whole heated under reflux for 15 minutes, cooled in ice and poured into dry ether. The precipitated gum was twice stirred with fresh portions of ether (25 ml.) and then dissolved in ethanol (10 ml.). To this solution was added 1:3-diethyl-2-thio-barbituric acid (1.5 g.) and triethylamine (1.4 ml.) After heating under reflux for 10 minutes the solution was cooled in ice and filtered. The crude dye (0.74 g.) had M. Pt. 275–280° C. and was crystallised from ethanol (50 ml.) to give small yellow needles (0.5 g.) with M. Pt. 285–287° C.

When incorporated in a silver chlorobromide emulsion the sensitivity was extended to 4850 A. with a maximum at 4700 A.

Example 10

3-ETHYL-2-THIO-5[(1-ETHYL-3 - HYDROXY - 3:5:5 - TRIMETHYL - 2 - PYRROLIDINYLIDENE) ETHYLIDENE]-THIAZOLID-4-ONE

The dye was prepared by the method of Example 1, substituting ethyl iodide for methyl iodide. The product crystallised from the reaction mixture on cooling and was filtered off and washed with ethanol (2–3 ml.). This crude solid (1.65 g. M. Pt. 197° C.) was crystallised from ethanol (150 ml.) to give orange needles (1.3 g.) with M. Pt. 215° C.

When incorporated in a silver chlorobromide emulsion the sensitivity was extended to 5800 A. with a maximum at 5300 A.

Example 11

2(3-HYDROXY-1:3:5:5 - TETRAMETHYL - Δ' - PYRROLINE)-4(1-METHYLQUINAZOLINE) MONOMETHINCYANINE IODIDE

3 - hydroxy - 2:3:5:5-tetramethyl-Δ'-pyrroline (0.7 g.) and methly iodide (1 ml.) were mixed, warmed under reflux for 10–15 minutes and then excess methyl iodide evaporated off under reduced pressure. To the solid was added 1-methyl-4-methylthio-quinazolinium iodide (1.5 g.), ethanol (10 ml.) and triethylamine (0.8 ml.). After heating under reflux for 10 minutes the solution was cooled, filtered and the product washed with ethanol. The crude solid (1.3 g. M. Pt. 225° C.) was crystallised from ethanol (15 ml.) to leave the dye as yellow crystals (0.96 g.) with M. Pt. 255° C.

Example 12

3-PHENYL - 2 - THIO - 5[(3 - HYDROXY - 1:3:5:5-TETRAMETHYL - 2 - PYRROLIDINYLIDENE) ETHYLIDENE]-THIAZOLID-4-ONE

3 - hydroxy - 2:3:5:5-tetramethyl-Δ'-pyrroline (1.4 g.) and methyl iodide (1.4 ml.) were mixed, warmed under reflux for 10–15 minutes and then the excess methyl iodide evaporated off under reduced pressure. Diphenyl formamidine (2.0 g.) and acetic anhydride (10 ml.) were then added and the whole heated under reflux for 15 minutes, cooled in ice and poured into dry ether. The precipitated gum was twice stirred and fresh portions of ether (25 ml.) and then dissolved in ethanol (10 ml.). To this solution was added 3-phenyl-2-thiothiazolid-4-one (1.5 g.) and triethylamine (1.4 ml.). After heating under reflux for 10 minutes the solution was cooled and diluted with water. The precipitated product (1.5 g. M. Pt. 194–204° C.) was crystallised from benzene (200 ml.) to give small orange needles (0.8 g.) with M. Pt. 225–228° C.

7

When incorporated in a silver chlorobromide emulsion the sensitivity was extended to 5800 A. with a maximum at 5300 A.

Example 13

3[(3-HYDROXY-1:3:5:5-TETRAMETHYL-2-PYRROLI-DINYLIDENE) ETHYLIDENE] ACETYLACETONE

3 - hydroxy - 2:3:5:5-tetramethyl-Δ'-pyrroline (1.4 g.) and methyl iodide (1.4 ml.) were mixed, warmed under reflux for 10–15 minutes and then excess methyl iodide evaporated off under reduced pressure. To the solid was added 3-ethoxymethylene-acetylacetone (2 g.), ethanol (10 ml.) and triethylamine (1.4 ml.). The whole was then heated under reflux for 10 minutes, cooled in ice and diluted with water (50 ml.). The dye slowly separated and was filtered off and purified by solution in methanol (5 ml.) followed by precipitation with ether. The yellow dye (0.15 g.) had M. Pt. 177° C.

Example 14

BIS-2(3-HYDROXY-1:3:5:5-TETRAMETHYL-Δ'-PYRROL-INE) TRIMETHINCYANINE IODIDE

3 - hydroxy - 2:3:5:5-tetramethyl-Δ'-pyrroline (1.4 g.) and methyl iodide (1.4 ml.) were mixed, warmed under reflux for 10–15 minutes and then excess methyl iodide evaporated off under reduced pressure. To the solid was added pyridine (10 ml.) and ethylorthoformate (3 ml.) and the whole heated under reflux for ½ hour. The dye was isolated by diluting with water followed by chloroform extraction. Evaporation of the extract left a residue which after stirring with ether and filtration remained as dye (1 g.) with M. Pt. 230–240° C. After crystallisation from ethanol (7.5 ml.) the dye formed microscopic yellow crystals with M. Pt. 254° C.

When incorporated in a silver chlorobromide emulsion the sensitivity was extended to 4500 A.

Example 15

2(3-METHYL-BENZTHIAZOLE)-2(3-HYDROXY-1:3:5:5-TETRAMETHYL PYRROLINE) PENTAMETHINCYANINE IODIDE

3 - hydroxy - 2:3:5:5-tetramethyl-Δ'-pyrroline (1.4 g.) and methyl iodide (1.4 ml.) were mixed, warmed under reflux for 10–15 minutes and then the excess methyl iodide evaporated off under reduced pressure. β-Anilino acrolein and hydrochloride (2.6 g.), fused sodium acetate (0.8 g.) and acetic anhydride (10 ml.) were then added and the whole heated under reflux for 20 minutes, cooled and poured into dry ether. The precipitated gum was dissolved in ethanol and 2-methyl-benzthiazole methiodide (2.3 g.) and triethylamine (1.4 ml.) added to the solution. The whole was then heated under reflux for 5 minutes, cooled and filtered. The residue of bis-2(3-methyl-benzthiazole) pentamethincyanine iodide was discarded. Addition of ether to the filtrate precipitated the product which was filtered off. This crude material (0.95 g. M. Pt. 225–230° C.) was crystallised from ethanol (70 ml.) to give the dye as glittering blue crystals (0.45 g.) with M. Pt. 228° C.

When incorporated in a silver iodobromide emulsion the dye gave a band of sensitivity from 5700 A. to 6550 A. with a maximum at 6300 A.

Example 16

1-PHENYL-3-METHYL-4[(3-HYDROXY-1:3:5:5-TETRA-METHYL-2-PYRROLIDINYLIDENE) ETHYLIDENE]-PYRAZOL-5-ONE

3 - hydroxy - 2:3:5:5-tetramethyl-Δ'-pyrroline (1.4 g.) and methyl iodide (1.4 ml.) were mixed, warmed under reflux for 10–15 minutes and then the excess methyl iodide evaporated off under reduced pressure. Diphenyl formamidine (2.2 g.) and acetic anhydride (10 ml.) were then added and the whole heated under reflux for 15 minutes, cooled and poured into dry ether to precipitate a gum which was dissolved in ethanol (10 ml.). To this solution was added 1-phenyl-3-methyl-pyrazol-5-one (1.4 g.) and triethylamine (1.4 ml.). After heating under reflux for 10 minutes the solution was cooled and diluted with water (50–60 ml.) to precipitate an oil which partially crystallised when stirred with acetone to leave, after filtration, the dye as orange plates with M. Pt. 170° C.

Example 17

2(3:3-DICYANO-ALLYLIDENE)3-HYDROXY-1:3:5:5-TETRAMETHYL-PYRROLIDINE 3-hydroxy-2:3:5:5-tetramethyl-Δ'-pyrroline (1.4 g.) and methyl iodide (1.4 ml.) were mixed, warmed under reflux for 10–15 minutes and then the excess methyl iodide evaporated off under reduced pressure. Diphenyl formamidine (2.2 g.) and acetic anhydride (10 ml.) were then added and the whole heated under reflux for 15 minutes, cooled and poured into dry ether to precipitate a gum which was dissolved in ethanol (10 ml.). To this solution was added malondinitrile (0.66 g.) and triethylamine (1.4 ml.). After heating under reflux for 10 minutes, the solution was cooled and diluted with water (50–60 ml.), the product slowly separating. After filtration and washing with ethanol the crude material (0.44 g. M. Pt. 167° C.) was crystallised from ethanol (10 ml.) to give microscopic yellow crystals (0.28 g.) with M. Pt. 178° C.

What we claim is:

1. A dyestuff of the formula:

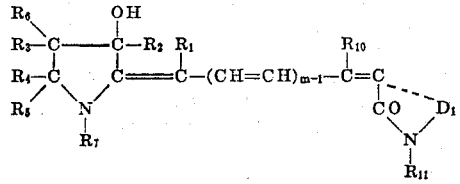

wherein $R_1$, $R_2$, $R_3$, $R_6$ and $R_{10}$ are each selected from the class consisting of the hydrogen atom and lower alkyl groups, $R_4$ and $R_5$ are each a lower alkyl group, $R_7$ is selected from the class consisting of lower alkyl and benzyl groups, $R_{11}$ is selected from the class consisting of lower alkyl, phenyl, benzyl, hydroxy carbonyl lower alkyl and lower alkoxy carbonyl lower alkyl groups, $D_1$ is a residue of a heterocyclic ring selected from the class consisting of thiathiazolidone, barbituric acid, hydantoin and pyrazole-5-one, and $m$ is an integer from 1 to 3, and the said compounds in which the indicated hydroxy group is acylated.

2. The compound 3-ethyl-2-thio-5[(3-hydroxy-1:3:5:5-tetramethyl-2-pyrrolidinylidene) ethylidene] thiazolid-4-one.

3. The compound 1:3-dimethyl-5[3-hydroxy-1:3:5:5-tetramethyl-2-pyrrolidinylidene) ethylidene]-2-thiohydantoin.

4. The compound 3-ethyl-2-thio-[(3-acetoxy-1:3:5:5-tetramethyl-2-pyrrolidinylidene) ethylidene]-thiazolid-4-one.

5. The compound 1:3-diethyl-5[(3-hydroxy-1:3:5:5-tetramethyl-2-pyrrolidinylidene) ethylidene]-2-thio-barbituric acid.

6. The compound 3-ethyl-2-thio-5[(1-ethyl-3-hydroxy-3:5:5-trimethyl-2-pyrrolidinylidene) ethylidene]thiazolid-4-one.

References Cited in the file of this patent

UNITED STATES PATENTS

| | | |
|---|---|---|
| 2,298,731 | Brooker et al. | Oct. 13, 1940 |
| 2,409,612 | Brooker et al. | Aug. 15, 1941 |
| 2,739,148 | Reed | Mar. 20, 1956 |

OTHER REFERENCES

Venkataraman: Synthetic Dyes, vol. 11, pp. 1143 to 1185, Academic Press Inc. 1952.

Chemical Abstracts, vol. 37, pp. 638 to 639 (1943).

Brooker et al.: Journal of the American Chemical Society, vol. 67, pp. 1869 to 1874 (1945).

Strell et al.: Chemische Berichte, vol. 87, pp. 1025 to 1032 (1954).